US006693531B2

(12) United States Patent
Grauer

(10) Patent No.: US 6,693,531 B2
(45) Date of Patent: Feb. 17, 2004

(54) INTEGRATED CONTROL OF A SYSTEM

(75) Inventor: Logan Grauer, Regina (CA)

(73) Assignee: Uponor Canada Inc., Regina (CA)

( * ) Notice: Subject to any disclaimer, the term of this patent is extended or adjusted under 35 U.S.C. 154(b) by 0 days.

(21) Appl. No.: 10/125,231

(22) Filed: Apr. 18, 2002

(65) Prior Publication Data

US 2003/0200011 A1 Oct. 23, 2003

(51) Int. Cl.$^7$ .............................................. G08B 29/00
(52) U.S. Cl. ...................... 340/506; 340/508; 340/517; 340/521
(58) Field of Search ....................... 340/310.01, 310.06, 340/310.07, 310.08, 506, 508, 517, 521, 825.52; 700/9, 17, 18, 83, 86, 276, 90; 714/47; 236/1 A, 10; 235/454, 492

(56) References Cited

U.S. PATENT DOCUMENTS

| | | | | |
|---|---|---|---|---|
| 4,153,945 A | * | 5/1979 | Actor et al. .................. 714/47 |
| 4,663,704 A | * | 5/1987 | Jones et al. .................. 700/83 |
| 5,801,940 A | * | 9/1998 | Russ et al. ..................... 700/9 |
| 5,835,005 A | * | 11/1998 | Furukawa et al. ...... 340/310.01 |
| 6,061,604 A | * | 5/2000 | Russ et al. ............. 340/825.52 |
| 6,109,531 A | * | 8/2000 | Hollis .......................... 236/10 |
| 6,446,867 B1 | * | 9/2002 | Sanchez ...................... 235/454 |

\* cited by examiner

*Primary Examiner*—Van Trieu
(74) *Attorney, Agent, or Firm*—Larkin, Hoffman, Daly & Lindgren, Ltd.

(57) ABSTRACT

A controlled system comprises a plurality of peripheral operating devices connected to an electrical power supply. Each of a plurality of local controllers is mounted near an associated peripheral operating device, and is connected in series with the power supply to the associated peripheral. Each of a plurality of sensors is connected to a local controller and is operative to send sensor information to the connected local controller. An interface is operative to enable each local controller to communicate with each other local controller. Each local controller is operative to receive information from a connected sensor and from other local controllers, send information from the connected sensor to other local controllers, and control power to the associated peripheral operating device in response to information received from the connected sensor or other local controllers.

19 Claims, 5 Drawing Sheets

INTEGRATED CONTROL OF A SYSTEM

This invention is in the field of controls and in particular such controls where a plurality of peripheral operating devices are turned on and off in response to sensor information.

BACKGROUND

Control systems, such as are used in heating, ventilation and air-conditioning (HVAC) systems, are becoming more complex with a wider range of integrated systems. It is advantageous, for example, to integrate radiant floor heating control systems with the control of potable hot water heating, ventilation, and air-conditioning systems. As more systems are integrated into the control scheme, the wiring becomes complex, the number of wiring terminals and the size of the control enclosure increase, and the systems generally become difficult to install and manage.

Typically such systems are designed by a person or group of people who are not involved in actually installing or commissioning the system. The system is generally installed by a plumbing contractor, wired by a licensed electrician, and commissioned by a HVAC contractor, each of whom has various areas of expertise.

Using the example of HVAC systems, a widely varying number of peripheral operating devices (peripherals), such as fans, furnaces, air-conditioners, boilers, circulators and the like, are operated by a controller. Conventionally the power supply to each peripheral is connected to a central controller which in turn is connected to the main power supply box. The central controller receives information from sensors, processes the information, and connects and disconnects the power supply to each peripheral as required. This conventional system requires that a power supply line runs from each peripheral to the central controller. At the central controller, the power supply line must be connected to a specific terminal, or at least to an identifiable terminal such that the person setting up the system can correctly route commands. The central controller will connect the power supply to certain terminals to power a certain peripheral—if a different peripheral is connected to those terminals the wrong peripheral will receive power. As well, since all power for all peripherals must pass through the central controller, a high capacity connection is needed between the main power supply box and the central controller.

All higher voltage power supply wiring and connecting, typically household power at 120 or 240 volts, must be done by a licensed electrician, who may not also be trained in the wiring of the control system. Control wiring to sensors, switches, processors, and the like is operated at relatively low voltages and can be connected by a person not so licensed but versed in the particular needs of the system.

It would be an advantage to provide a control system for peripherals wherein the wiring of the higher voltage power supply lines could be more simply accomplished by a licensed electrician without requiring special knowledge of the control system itself. It would be a further advantage to provide such a system wherein the power supply was wired from the main power supply box to the peripherals, rather than first to a central controller and from there to the peripherals.

Operation of control systems requires sensor input information from sensors measuring temperature, liquid flow, air movement, humidity, pressure, and so forth. The sensor input can be a variation in voltage, current, electrical resistance, on/off voltage, or other signal that is received by the system in some manner.

In conventional control systems such sensors are also connected to the central controller, often requiring lengthy connecting lines. In many cases these sensors are located in close proximity to various peripherals, for example a boiler return sensor is typically located adjacent to the boiler. Instead of connecting the boiler return sensor to the central controller it would be advantageous to run a shorter line connecting it to the system at a local controller located in proximity to the boiler. The local controller could then be in communication with other local controllers at each peripheral in the system, and a master controller if desired, to transfer any information required by other parts of the system. Pre-wired leads with plug-in connectors could also be supplied if it was known that the distance from the sensor to the nearest local controller would not exceed a given distance, such as one meter, three meters or whatever. Such a system could go a long way to achieving "plug and play" ease of installation.

SUMMARY OF THE INVENTION

It is an object of the present invention to provide a controlled system of peripheral operating devices, controllers, and sensors wherein the necessary high voltage wiring is simplified, reducing the degree of system knowledge required by the licensed electrician installing the peripherals.

It is a further object of the present invention to provide such a system wherein a local controller is wired into the system at the power connection of a peripheral to control the peripheral in response to sensor information or commands from a master controller, and to receive sensor information and communicate same to other local controllers.

The present invention provides a controlled system comprising a plurality of peripheral operating devices, each connected to an electrical power supply. Each of a plurality of local controllers is mounted in close proximity to at least one associated peripheral operating device, and is connected in series with the power supply to the associated peripheral operating device. Each of a plurality of sensors is connected to a local controller and is operative to send sensor information to the connected local controller. An interface is operative to enable each local controller to communicate with each other local controller. Each local controller is operative to receive information from a connected sensor and from other local controllers, send information from the connected sensor to other local controllers, and control delivery of power from the power supply to the at least one associated peripheral operating device in response to information received from the connected sensor or other local controllers.

The system of the invention facilitates the connection of the power supply to the peripherals by a licensed electrician since the electrician needs only to connect power wires from the main power supply to each local controller, commonly configured as a terminal box conveniently mounted on the peripheral, and from each local controller to the associated peripheral. That is all the higher voltage wiring that is required. The balance of the installation can be done by a technician who does not have an electrician's license. Conveniently the local controller can comprise a switch and a central processing unit controlling the switch embedded in a circuit board that connects into the terminal box. To further simplify the installation, the central processing unit can be programmable, or several differently programmed central processing units can be embedded in interchangeable circuit boards. Then all the terminal boxes wired by the electrician would be the same. The installation technician would determine what function was required of the central processing unit at a particular local controller, and connect the appropriate circuit board.

A master controller for entering general system data and control programming by an operator could be readily included in the system as a separate device, or could be incorporated into a convenient local controller. Since each controller is essentially a node on a computer network, output from any local controller can be communicated to any other local controller that might require it. Information from a particular sensor is often required by a number of different local controllers in order for the controller to properly operate its associated peripheral. The disclosed system can readily provide information from any sensor connected to any local controller to any other local controller that requires the information.

The sensors in most cases will be located close to a local controller, and could thus be pre-wired with a length of sensor cable having a plug or socket on the end adapted to fit into a corresponding socket or plug on the local controller. To further avoid installation errors, the plugs and sockets could be configured such that only a suitable sensor could be plugged into each connecting location on the local controller. For example, a temperature sensor could only be plugged into the local controller at the connecting location that is programmed to receive temperature information, and would not fit into an adjacent location programmed to receive pressure, humidity, speed, or other like information. Similarly, a pressure sensor would only fit into the connection location programmed to receive pressure information, and not into any other connecting location.

DESCRIPTION OF THE DRAWINGS:

While the invention is claimed in the concluding portions hereof, preferred embodiments are provided in the accompanying detailed description which may be best understood in conjunction with the accompanying diagrams where like parts in each of the several-diagrams are labeled with like numbers, and where:

DETAILED DESCRIPTION OF THE ILLUSTRATED EMBODIMENTS

Figure 1:
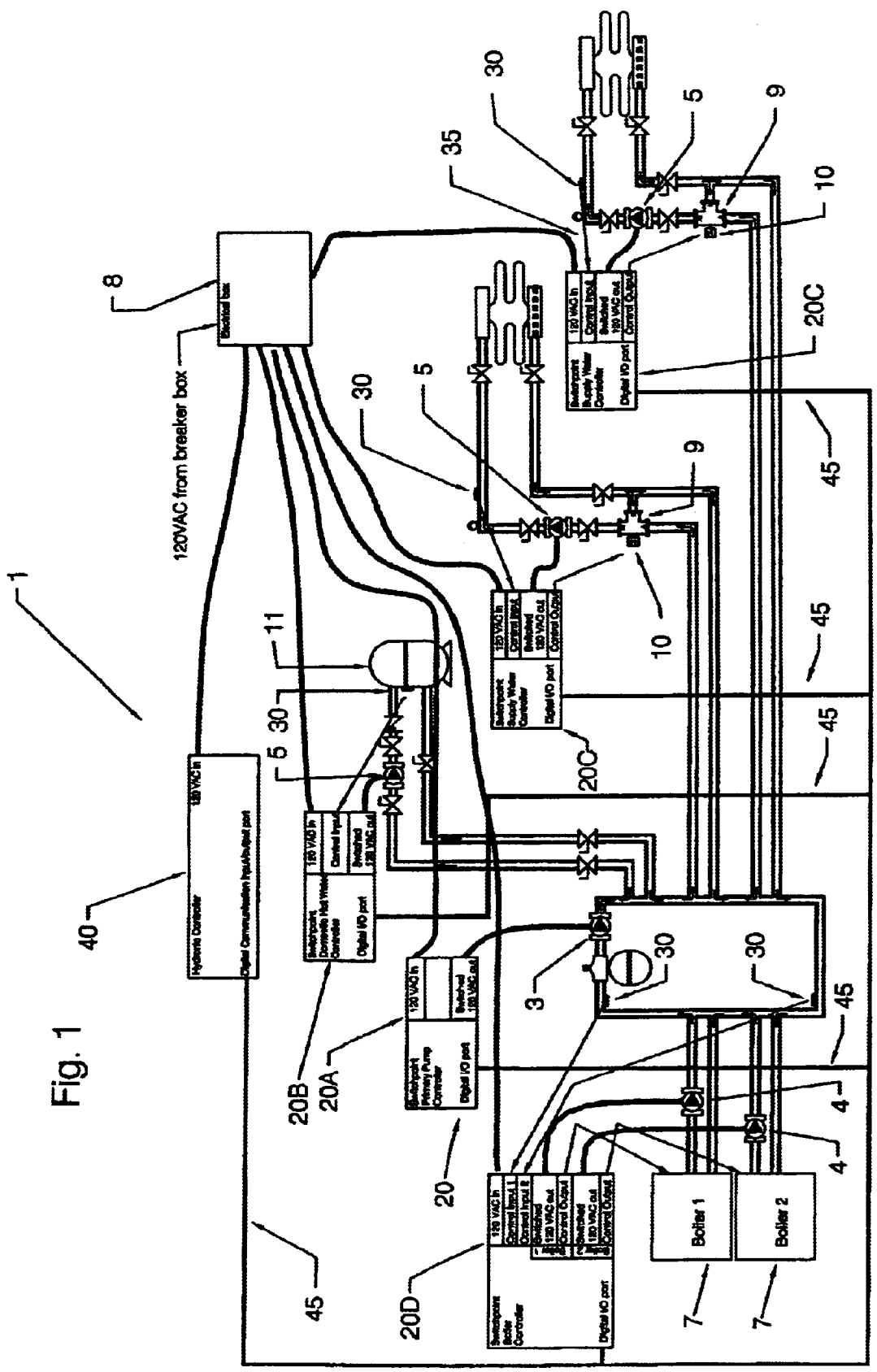
FIG. 1 is a schematic illustration of a controlled system embodying the invention.
Figure 2:
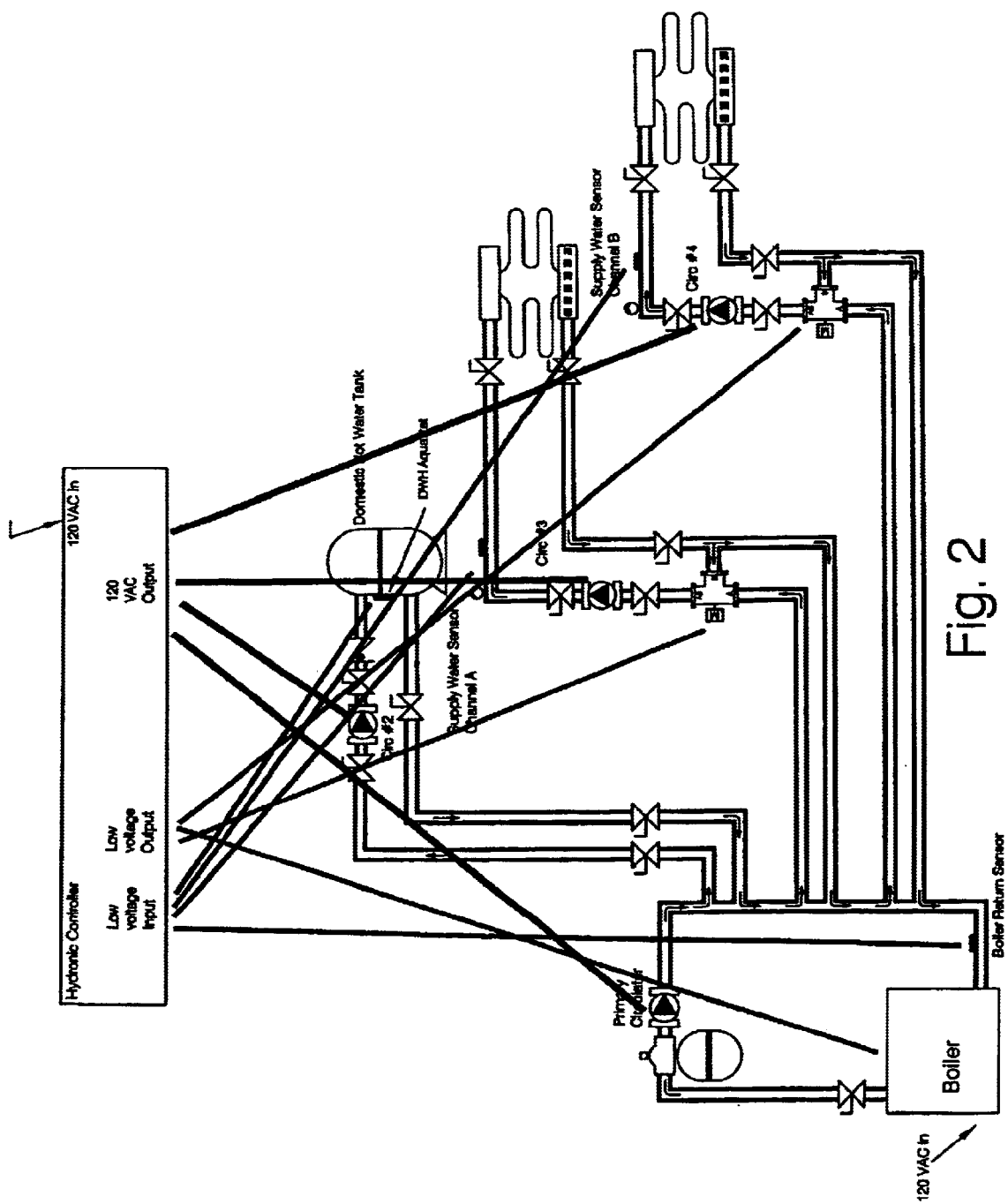
FIG. 2 is a schematic illustration of a controlled system as in the prior art.
Figure 3:
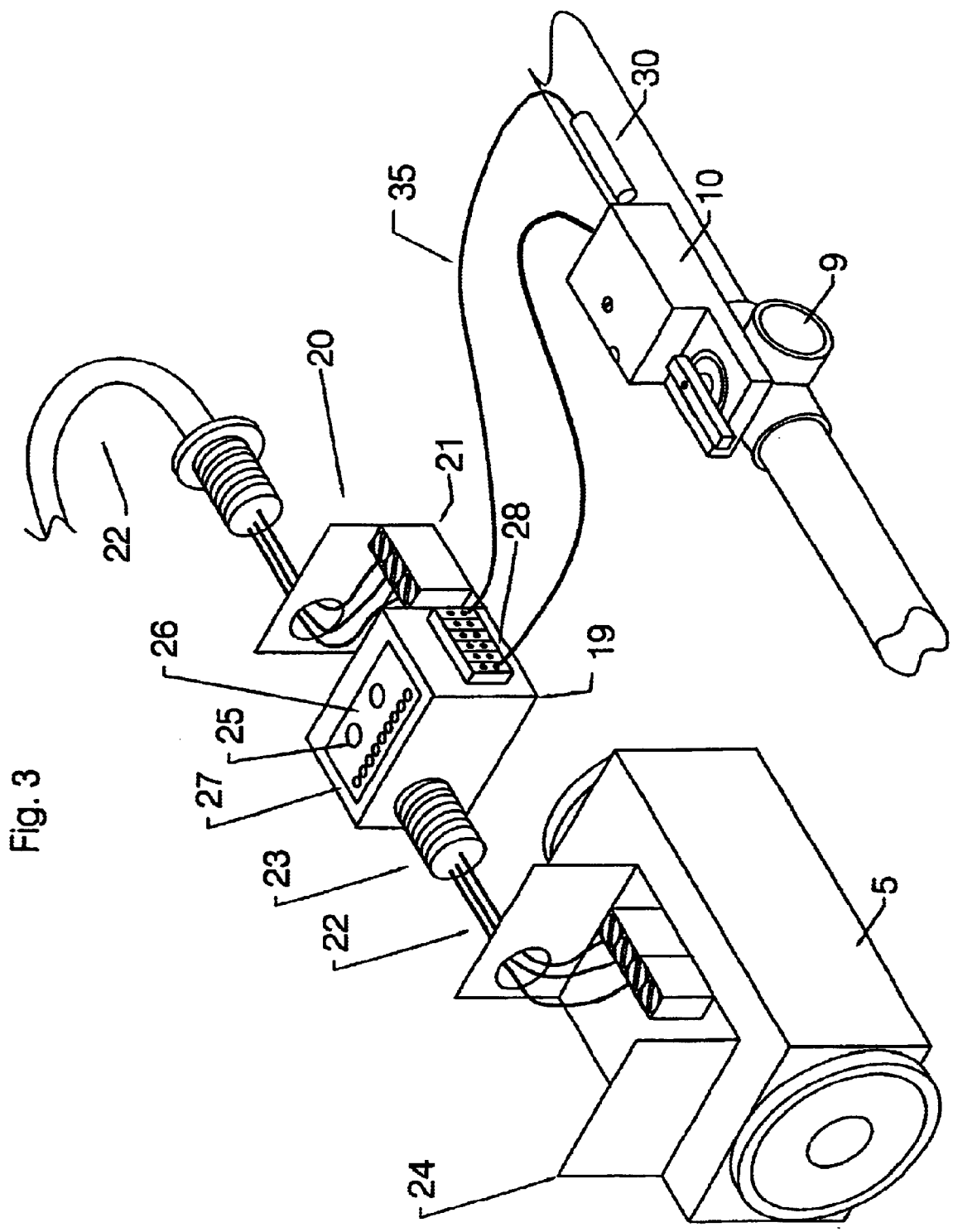
FIG. 3 is a perspective view of the installation of a local controller connected to a sensor, valve actuator, and circulator.

FIG. 1 illustrates a controlled HVAC system 1 comprising a plurality of peripheral operating devices, illustrated as a primary circulator 3, boiler circulators 4, zone circulators 5, and boilers 7. Each peripheral 3, 4, 5, 7 is connected to a conventional electrical power supply 8 delivering alternating current at 120 volts, 240 volts, or similar conventional voltages which are used in various systems. The system 1 further comprise a plurality of system components, illustrated as valves 9 which are turned open or closed by actuators 10, that are not connected to the power supply 8, but operate on lower voltage supplied as will be discussed below by a separate controlled low voltage supply. The system 1 further comprises a plurality of local controllers 20, each connected in series with the power supply to an associated peripheral operating device. Each local controller 20 is mounted in proximity to the associated peripheral, and may be mounted directly on the peripheral, as illustrated in FIG. 3. An interface is operative to enable each local controller to communicate with each other local controller.

As illustrated in FIG. 3, the local controller 20 comprises a terminal box 21 housing a switch in switch member 19 such that the switch is connected in series with the power supply wire 22 to the associated peripheral operating device, illustrated as zone circulator 5. The switch may be an on/off switch, simply connecting or disconnecting the power to the associated peripheral operating device, or it could be a triac switch varying the output voltage, or a like switch controlling power delivery to the peripheral operating device.

As illustrated the power output member 23 of terminal box 21 is inserted into the connection hole of the electrical connection box 24 of the zone circulator 5 and secured by a conventional nut threaded over the power output member 23. A central processing unit is embedded in a circuit board 26 is operatively and releasably connected to the switch member 19. The central processing unit is operative to receive information from other local controllers, send information from a connected sensor to other local controllers, and operate the switch in response to information received from the connected sensor or other local controllers. Further functions may be added as well if desired.

The circuit board 26 and switch member 19 comprise pins, sockets and like conventional "plug-in" connections to facilitate interchangeability of the circuit boards 26. A first central processing unit embedded in a first circuit board 26 and programmed to perform a first set of tasks is replaceable with a second central processing unit embedded in a second circuit board 26 and programmed to perform a second set of tasks. Thus all power supply wires 22 can be wired into a single terminal box 21 and then the circuit boards 26 can be changed to perform the desired function at the particular peripheral operating device.

Figure 5:
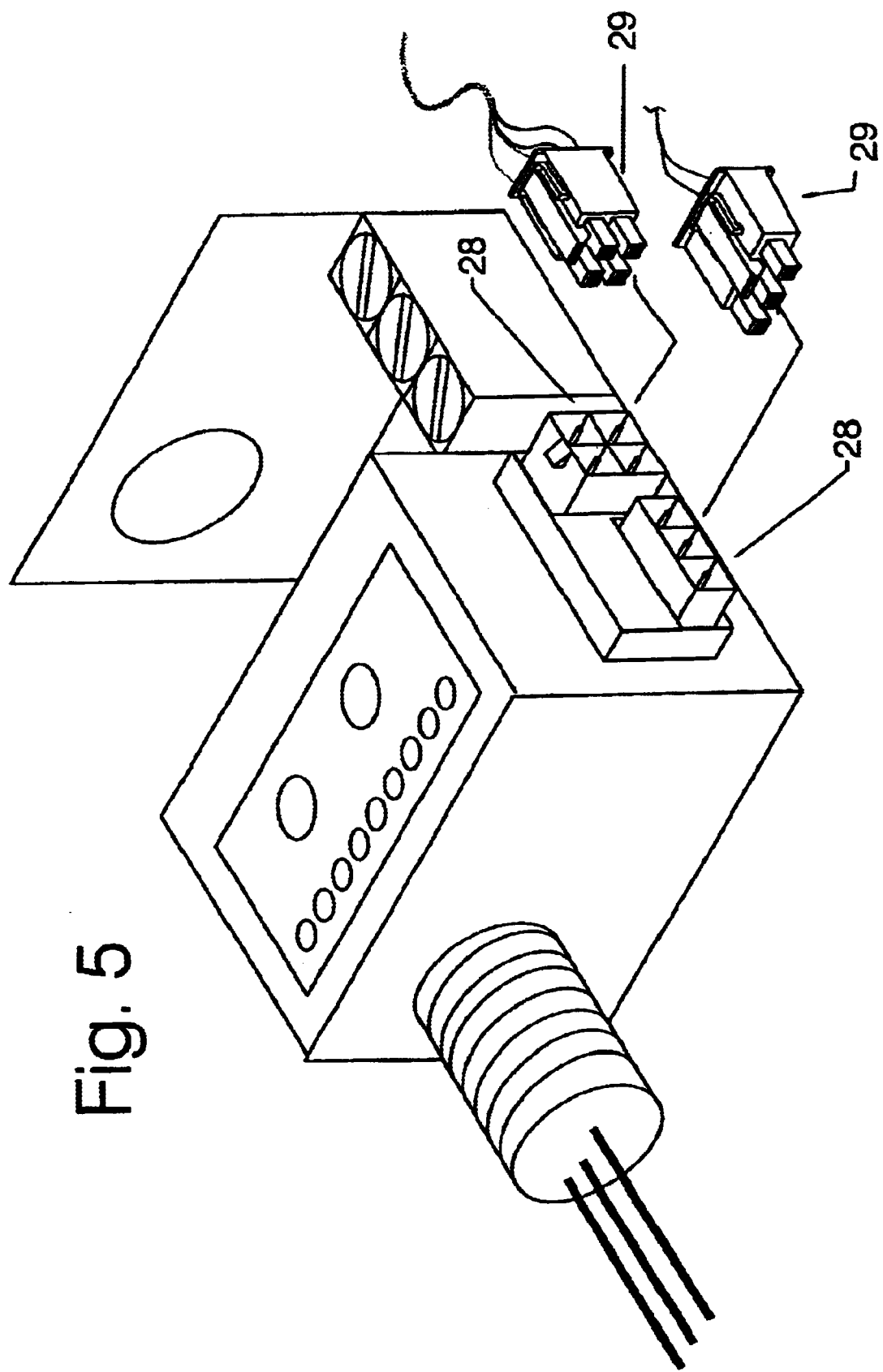
FIG. 5 is a perspective view of a sensor plug and socket configured to fit each other, and such that a sensor plug of a different shape cannot be plugged into the socket.

The circuit board 26 is adapted for connection to one or more sensors each operative to send sensor information to the central processing unit. A number of sensor sockets 28 are each operatively connected to the central processing unit embedded in the circuit board 26. Each sensor socket 28 can conveniently be configured to accept only a similarly configured mating end on a sensor cable 35. The mating end on the sensor cable 35 can be selected according to sensor function, and is thus adapted to plug into the local controller only at a selected location corresponding to the sensor function and is prevented from plugging into the local controller at a location corresponding to other sensor functions. Such a configuration prevents the insertion of, for example a temperature sensor plug into a socket that is programmed to receive information from a pressure sensor. Conveniently the mating end and selected socket 28 on the local controller 20 comprise a male plug 29 having an outer periphery shaped to allow insertion into the female socket 28 with the same shape, as illustrated in FIG. 5.

The sensors can include water temperature sensors 30 as illustrated, and can further include pressure sensors, air temperature sensors, humidity sensors, and the like. Each sensor needs only plug into the nearest local controller 20, and the information can be programmed into the central processing units to be sent and received by whichever other local controller 20 requires it. Pre-wired sensor cables can thus be supplied, further simplifying installation.

The sensors 30 are connected to one local controller by a sensor cable 35 having a mating end adapted to plug into the local controller 20 at the sensor sockets 28 on the circuit board 26. Alternatively the mating end on the sensor cable 35 could comprise a socket with a corresponding plug on the circuit board 26.

The local controller illustrated in FIG. 3 also conveniently includes an over-ride switch 25 to allow an operator to test operation of the associated peripheral operating device and local display indicators 27 operative to provide feedback on operation of the associated peripheral operating device.

The local controllers 20 include a local controller 20A that does not have a sensor connected to it, but receives information required to operate the primary circulator 3 from the master controller 40 or from other sensors via the communication cable 45, or through a wireless interface. Local controller 20D has a temperature sensor 30 connected to it, and controls the zone circulator 5 in the circuit heating the domestic hot water tank 11.

Local controllers 20C are each connected to a temperature sensor 30, and each controls a zone circulator 5. In addition the local controllers 20C are further programmed to activate and de-activate at least one further system component in response to information received from the connected sensor or other local controllers. In FIG. 1, the local controllers 20C also each control a valve actuator 10. These control outputs are low voltage and do not require a licensed electrician for hook-up.

A double local controller 20D is illustrated in FIG. 1 associated with first and second boiler circulators 4. The double local controller 20D is operative to control power delivery from the power supply wire 22 to each of the boiler circulators 4 independently in response to information received from the connected temperature sensors 30 or other local controllers. As in the local controller 20C, the double local controller 20D is further programmed to activate and deactivate internal controls on the boilers 7.

Figure 4:
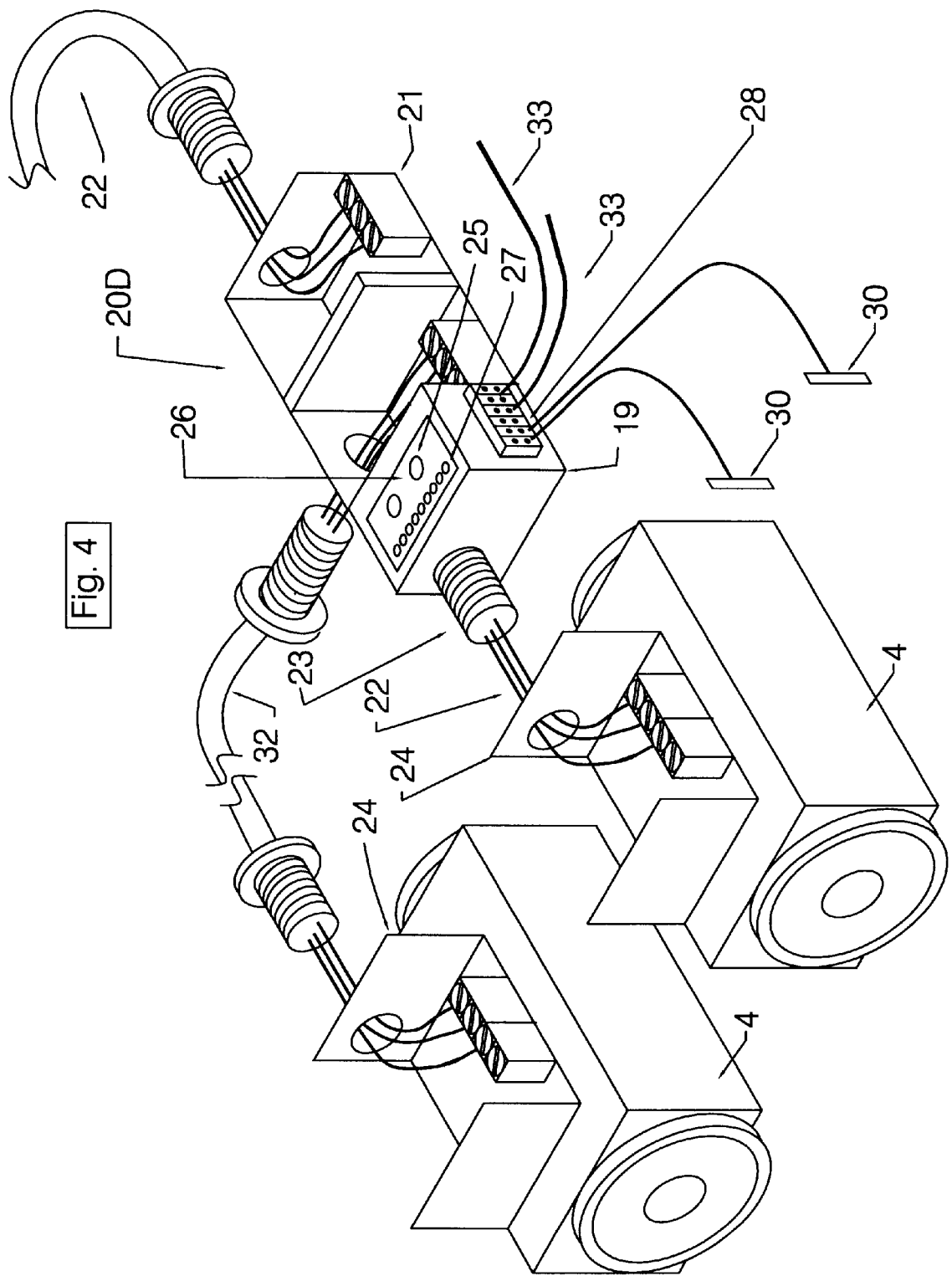
FIG. 4 is a perspective view of the installation of a double local controller to sensors and two circulators.

FIG. 4 illustrates the double local controller 20D mounted on the electrical connection box 24 of one boiler circulator 4, similar to the mounting of FIG. 3. A secondary power connection wire 32 is connected from the double local controller 20D to the second boiler circulator 4. This is a high voltage line and must be installed by a licensed electrician. The central processing unit in the circuit board 26 in the double local controller 20D is programmed to control power to each boiler circulator 4 independently, to receive information from each temperature sensor 30, and to activate internal controls on the boilers 7 through leads 33 as required in response to sensor information from the connected temperature sensors 30, or information received through the interface with other local controllers 20.

The system illustrated in FIG. 1 also includes a master controller 40 and the interface is operative to enable the master controller 40 to communicate with local controllers 20 such that the master controller 40 can receive information from each local controller 20 and can send information to each local controller 20, and wherein the local controllers 20 are operative to control power to the associated peripheral operating devices in response to information received from the master controller 20. The master controller can also operate the low voltage valve actuators 10 and controls for the boilers 7. The master controller 40 could poll each local controller 20, develop the required system settings from the information received, and send information back to those local controllers 20 where some action is required. If desired, the master controller 40 can act as the interface between the system and the operator of the system.

The interface allowing communication between the controllers 20, 40 can comprise a wireless communicator, such as a Bluetooth system, or a communications cable 45 could link the controllers as in FIG. 1.

In addition to the described local controllers 20, other configurations are contemplated as well as may be required by a particular application. The system is flexible allowing for many variations. Peripheral operating devices are wired to the power supply through a local controller, adjacent sensors are wired to a convenient local controller, and a communication interface between each local controller allows the exchange and use of sensor information wherever required in the system.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A controlled system comprising:
   a plurality of peripheral operating devices, each peripheral operating device connected to an electrical power supply;
   a plurality of local controllers, each local controller mounted in proximity to at least one associated peripheral operating device, and connected in series with the power supply to the at least one associated peripheral operating device;
   a plurality of sensors, each sensor connected to a local controller and operative to send sensor information to the connected local controller;
   an interface operative to enable each local controller to communicate with each other local controller;
   wherein each local controller is operative to receive information from a connected sensor and from other local controllers; is operative to send information from the connected sensor to other local controllers; and is operative to control delivery of power from the power supply to the at least one associated peripheral operating device in response to information received from the connected sensor or other local controllers.

2. The system of claim 1 wherein the local controller is operative to connect and disconnect the first associated peripheral operating device and the power supply.

3. The system of claim 1 wherein the local controller is operative to vary the voltage of power delivered to the associated peripheral operating device.

4. The system of claim 1 further comprising a master controller wherein the interface is operative to enable the master controller to communicate with local controllers such that the master controller can receive information from each local controller and can send information to each local controller, and wherein the local controllers are operative to connect and disconnect associated peripheral operating devices and the power supply in response to information received from the master controller.

5. The system of claim 1 wherein at least one sensor is connected to a local controller by a sensor cable having a mating end adapted to plug into the local controller.

6. The system of claim 5 wherein the mating end is selected according to a sensor function, and wherein the mating end is adapted to plug into the local controller at a selected location corresponding to the sensor function and is prevented from plugging into the local controller at a location corresponding to other sensor functions.

7. The system of claim 6 wherein the mating end and selected location on the local controller comprise a male plug having an outer periphery shaped to allow insertion into a female socket.

8. The system of claim 1 wherein at least one local controller comprises a terminal box housing a switch connected in series with the power supply to the associated peripheral operating device and a central processing unit operatively and releasably connected to the switch and adapted for connection to at least one sensor, the central processing unit operative to receive information from other local controllers, send information from a connected sensor to other local controllers, and manipulate the switch to control delivery of power from the power supply to the at least one associated peripheral operating device in response to information received from the connected sensor or other local controllers.

9. The system of claim 8 wherein the central processing unit is programmable to selectively perform either a first set of tasks or a second set of tasks.

10. The system of claim 8 wherein the central processing unit is embedded in a circuit board, and wherein a first central processing unit embedded in a first circuit board and programmed to perform a first set of tasks is replaceable with a second central processing unit embedded in a second circuit board and programmed to perform a second set of tasks.

11. The system of claim 10 wherein the circuit boards comprise a plurality of sensor sockets operatively connected to the central processing unit embedded in the board and wherein each sensor socket is configured to accept only a similarly configured sensor plug.

12. The system of claim 10 wherein at least two local controllers comprise terminal boxes adapted to accept the same first and second circuit boards such that the first and second circuit boards are interchangeable between the two local controllers.

13. The system of claim 1 wherein at least one local controller further comprises an over-ride switch to allow an operator to test operation of the associated peripheral operating device.

14. The system of claim 1 wherein at least one local controller further comprises local display indicators operative to provide feedback on operation of the associated peripheral operating device.

15. The system of claim 1 wherein the interface comprises a wireless communicator.

16. The system of claim 1 wherein the interface comprises a cable linking at least two local controllers.

17. The system of claim 1 wherein at least one local controller is a double local controller associated with first and second peripheral operating devices and wherein the double local controller is operative to control delivery of power from the power supply to the first associated peripheral operating device and to control delivery of power from the power supply to the second associated peripheral operating device independently in response to information received from the connected sensor or other local controllers.

18. The system of claim 1 wherein at least one local controller is further operative to activate and deactivate at least one further system component in response to information received from the connected sensor or other local controllers.

19. The system of claim 1 wherein the system is a heating, ventilation, and air conditioning system.

* * * * *